United States Patent [19]

Lee et al.

[11] Patent Number: 5,055,240

[45] Date of Patent: Oct. 8, 1991

[54] METHOD AND APPARATUS FOR PRODUCING MICROSHELLS

[75] Inventors: Mark C. Lee, La Canada, Calif.; Christopher H. Schilling, Richland, Wash.; Taylor G. Wang, Glendale, Calif.

[73] Assignee: The United States of America as represented by the Administrator of the National Aeronautics and Space Administration, Washington, D.C.

[21] Appl. No.: 858,054

[22] Filed: Apr. 30, 1986

[51] Int. Cl.$^5$ ............................................. B29B 9/10
[52] U.S. Cl. ..................................... 264/5; 65/21.4; 75/331; 75/338; 75/340; 75/342; 264/12; 264/13; 264/15; 425/6; 425/7
[58] Field of Search ................... 264/5, 12, 15, 43, 50, 264/42, 13; 521/74; 425/4 R, 4 C, 6, 7; 75/331, 338, 340, 342; 65/21.4

[56] References Cited

U.S. PATENT DOCUMENTS

| | | | |
|---|---|---|---|
| 4,009,232 | 2/1977 | Shiiki et al. | 264/9 |
| 4,017,290 | 4/1977 | Budrick et al. | 65/21 |
| 4,133,854 | 1/1979 | Hendricks | 264/10 |
| 4,257,799 | 3/1981 | Rosencwaig et al. | 65/21.4 |
| 4,344,787 | 8/1982 | Wang et al. | 65/21.4 |
| 4,424,287 | 1/1984 | Johnson et al. | 521/74 |
| 4,485,520 | 12/1984 | Handl et al. | 15/424 |

*Primary Examiner*—Mary Lynn Theisen
*Attorney, Agent, or Firm*—Thomas H. Jones; Harold W. Adams; John R. Manning

[57] ABSTRACT

A method is described for forming hollow particles, or shells, of extremely small size. The shell material is heated to a molten temperature in the presence of a gas that is at least moderately soluble in the shell material, to form a solution of the molten shell material and the soluble gas. The solution is atomized to form a multiplicity of separate droplets that are cooled while in free fall. Cooling of a droplet from the outside traps the dissolved gas and forces it to form a gas bubble at the center of the droplet which now forms a gas-filled shell. The shell is reheated and then cooled in free fall, in an environment having a lower pressure than the gas pressure in the shell. This causes expansion of the shell, to form a shell having a small wall thickness compared to its diameter.

14 Claims, 2 Drawing Sheets

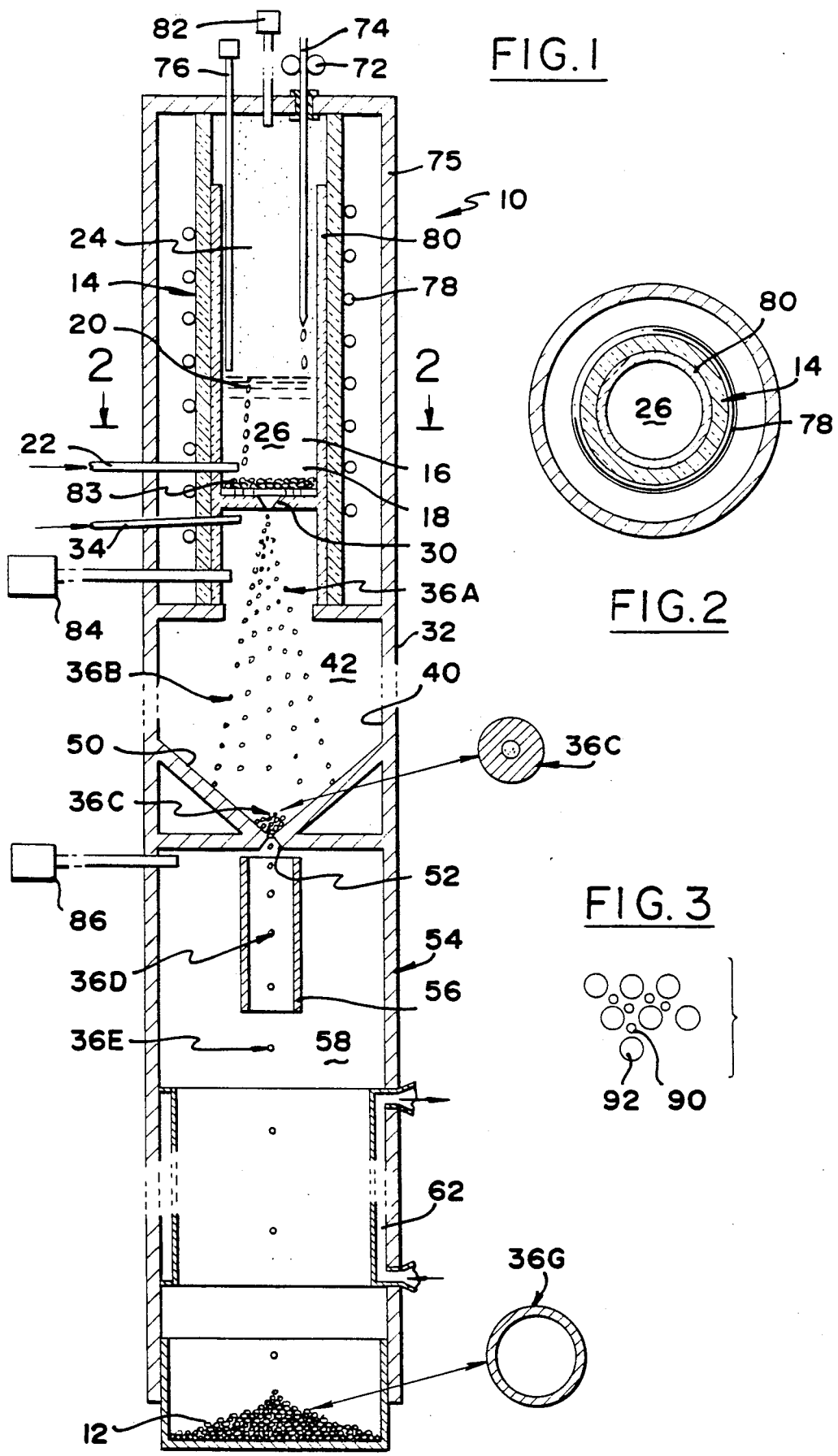

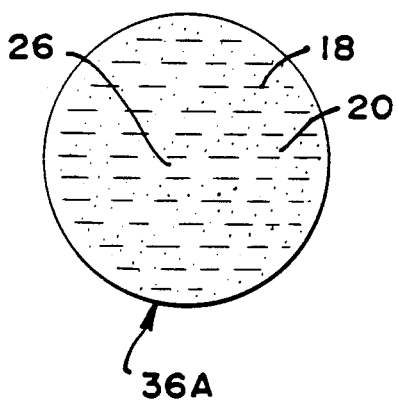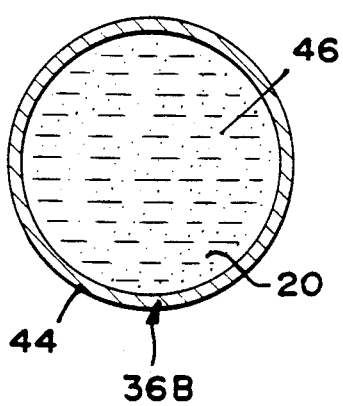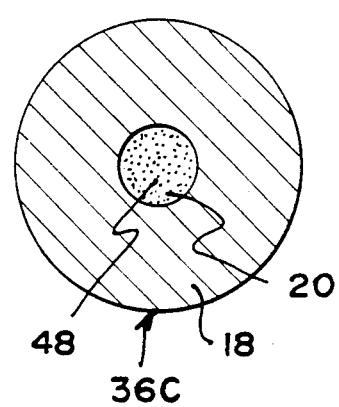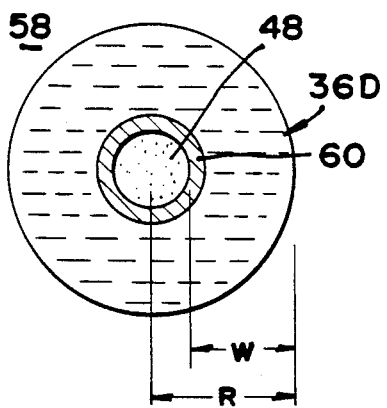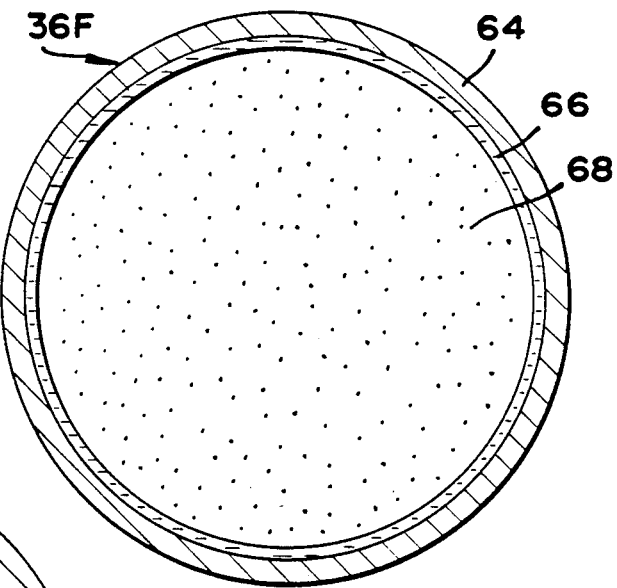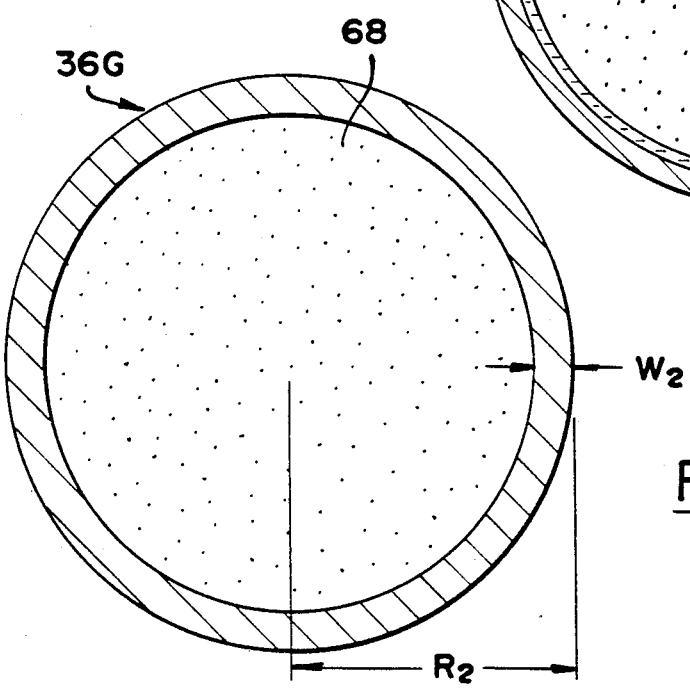

METHOD AND APPARATUS FOR PRODUCING MICROSHELLS

ORIGIN OF INVENTION

The invention described herein was made in the performance of work under a NASA contract, and is subject to the provisions of Public Law 96-517 (35 USC 202) in which the Contractor has elected to retain title.

BACKGROUND OF THE INVENTION

There are many potential uses for microshells having an outside diameter considerably below one millimeter. As one example, the microshells can be used as a filler material in structural members such as reinforced beams. Inasmuch as the strength-to-weight ratio of a mass of such shells increases as the size of the pores (here the bubbles in the shells) decreases, shells of especially small size are desirable.

Shells of a size down to about one-half millimeter can be readily produced by a number of methods. In one method, the molten shell material is extruded through an outer nozzle, while a gas is extruded through a concentric inner nozzle, to form a hollow stream that breaks up into gas-filled shells. As the diameter of the nozzles decreases, it becomes difficult to machine them and to position the tiny inner nozzle, and there is more frequent blocking of the space between nozzles by unwanted solid particles. Shells can be formed by dry chemical-blowing processes, but the materials are limited by available compatible frit-combinations, and are usually useful only for low-melt materials such as polymers, plastics, and low-temperature glasses. A method for producing microshells of a wide variety of materials, including refractory metals and alloys, would be of considerable value.

SUMMARY OF THE INVENTION

In accordance with one embodiment of the present invention, a method is provided for facilitating the formation of small shells of any of a variety of materials. The method includes establishing a quantity of solidifiable melt material in a molten state, in the presence of a gas which is at least moderately soluble in the melt material, to form a solution of the melt material and gas. The solution is atomized to form multiple droplets, and the droplets are cooled from the outside until the melt material solidifies. As the melt material solidifies from the outside, it pushes dissolved gas inwardly towards the center of the shell to form a gas bubble therein.

After the shell has hardened, it can be reheated in free fall, in an atmosphere of lower total pressure than the pressure of gas in the shell. The lower pressure permits expansion of the gas bubble to reduce the "aspect ratio" of the shell which is the ratio of its outside radius to its wall thickness.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional view of the apparatus of the present invention, showing a method of the present invention.

FIG. 2 is a view taken on the line 2—2 of FIG. 1.

FIG. 3 is a representation of the molecular structure of the melt in FIG. 1.

FIGS. 4–6 are cross sections of a droplet in the apparatus of FIG. 1, showing steps during initial formation of the shell.

FIGS. 7–9 illustrate a droplet similar to that of FIG. 6, but during a remelt process shown in FIG. 1, to increase the "aspect ratio" of the shell of FIG. 6.

DESCRIPTION OF THE PREFERRED EMBODIMENTS

FIG. 1 illustrates a system 10 which forms gas-filled shells 12 of small size. The system includes a vessel 14 containing a quantity 16 of a melt material 18. The melt material 18 can be heated to a liquid state, and solidifies when it is cooled to a lower temperature which is above room temperature and above the liquefication temperature of the gas. The melt material 18 is maintained in a molten state in the presence of a gas 20 that is at least moderately soluble in the melt material 18. Here, the soluble gas 20 is bubbled up through the melt through a bubble tube 22, and the soluble gas constitutes part of the gas which lies in the space 24 above the melt. The result is a solution 26 in the vessel 14 which includes the molten melt material 18 with the soluble gas 20 in solution therein.

The solution 26 is ejected through a nozzle 30 into a first drop tower 32. A stream of gas is directed from a tube 34 across the outside of the nozzle 30 to break up the extrusion into a multiplicity of tiny droplets, to thereby atomize the solution. Atomization can be produced by placing a gas-emitting tube behind the nozzle to agitate the emitted stream. Each of the droplets 36A comprises a microscopic solid mass of the solution 26. FIG. 4 is an enlarged sectional view of such a droplet 36A, which includes the melt material 18 in a liquid state, and the soluble gas 20 dissolved in the liquid melt material.

The inside walls 40 (FIG. 1) of the drop tower are at a lower temperature than the melting temperature of the melt material 18. Also, the environment 42 in the drop tower preferably comprises gas at a lower temperature than the melting temperature of the melt material. The falling droplet 36A therefore is cooled from the outside until, at the droplet position 36B the periphery of the droplet has solidified or at least has become highly viscous and is approaching a solid state. FIG. 5 is a cross section of the droplet 36B, showing the outside 44 is largely solidified while the inside 46 is still at a higher temperature than the outside and is molten or less viscous.

As the hardening portion 44 of the droplet advances radially inwardly, it drives the dissolved gas 20 inwardly in front of it. This is partially due to the fact that a solid material generally has a much lower saturation partial pressure of a soluble gas, than it did when it was liquid. The gas within the hardening outer portion of the droplet therefore cannot dissolve in the remaining liquid and forms gas bubbles. The gas cannot escape through the solid periphery of the cooling shell, because solid material is generally highly resistant to the migration of gas therethrough. FIG. 6 shows the droplet at 36C, with the melt or shell material 18 fully solidified, and with the gas 20 forming a bubble 48 at the center of the hollow droplet or shell.

FIG. 1 shows the solidified shells 36C collected at the bottom wall 50 of the first drop tower. Although such shells shown magnified at 36C in FIG. 1 can be useful in certain applications, there are many applications where shells having a higher aspect ratio (the ratio of shell radius to wall thickness) are desirable. The aspect ratio is increased by dropping the shells through an aperture 52 into a second drop tower 54. The bottom wall 50 of the first drop tower slows the descent velocity of the shells, and isolates the environments of the drop towers. In the second drop tower, the shells are reheated by a radiant heater 56 to melt the shell material. The atmosphere 58 in the second drop tower has a lower total pressure than the pressure of gas in the shells initially dropped into the second tower. The remelted shells are able to expand because the pressure of gas inside the shell 36C is greater than the pressure of the gaseous environment 52 in the second drop tower.

It would be possible to form the initial solid shells 36C in a batch process, and later, after the initial shells have cooled to near room temperature, to drop them through another drop tower (or the same one modified). However, for high melting temperature materials, whose melting temperature is above 1000° C., considerable time and energy is required to reheat them from room temperature to their melting temperature. In the case of such melt material, it is desirable to remelt the initial solid shells 36C while they are still very hot (above one-half their melting temperature, and therefore above 500° C.).

A partially-reheated shell 36D is shown in FIG. 7. It can be seen that the periphery of the shell is molten, but the radially inner portion of the shell at 60 has not yet been melted and is therefore solid. The solid inner portion 60 prevents expansion of the gas bubble 48. Once the entire shell is melted, it can expand until the pressure of the gas bubble 48 within the shell is about equal to the pressure of the gas environment 58 outside the shell (a small difference can exist due to surface tension of the liquid). As the gas bubble expands, the radius R of the shell increases, and the wall thickness W of the shell decreases. The liquid shell may grow to a diameter $R_2$ as shown in FIG. 9.

A fully melted and expanded liquid shell is indicated at 36E in FIG. 1. As the shell 36E falls through the drop tower, it cools from the outside. A portion of the drop tower below the heater 56 can be cooled as by a coolant passing upwardly through a conduit 62 along the lower portion of the tower 64. A partially-cooled shell 36F is shown in greater detail in FIG. 8. The periphery 64 of the shell is substantially solid, while the inner wall at 66 is substantially liquid. Finally, the shell cools to the configuration shown at 36G in FIG. 9. The diameter of the shell 36G is much larger than that of the shell 36C of FIG. 6. The larger ratio of shell outside radius $R_2$ to its wall thickness $W_2$ has advantages in many applications. For example, when the hollow shells are to be used as filler material, the larger diameter of the shells results in lighter weight. The fact that the filler shells have a small outside diameter, results in relatively high strength for the shells, for a given weight-to-volume ratio.

The system of FIG. 1 includes a roller feed mechanism 72 that feeds a rod 74 of the melt material 18 through a housing 75 of the system, into the region above the vessel where the tip of the rod melts. A melt level control device 76 senses when the top of the melt drops below a certain level, to cause the mechanism 72 to feed the rod towards the melt so as to maintain a constant level. A coil heater 78 heats the vessel 14 that contains the melt. The vessel includes a ceramic liner 80 for withstanding the high temperatures involved. A gas source 82 applies gas to the environment above the melt, to establish a predetermined pressure therein, with only some of the pressure caused by the soluble gas 20, and the rest caused by an inert gas such as argon. A granulated filter bed and filter 83 lies at the bottom of the melt. The atmospheres in the two drop towers 32, 54 are maintained by gas sources 84, 86.

The atomizing of the melt into numerous microscopic particles is a known process used to form powder in metallurgy. However, in forming particles for metallurgy, only an inert gas which is substantially insoluble in the melt or shell material is used, to substantially avoid the dissolving of gas in the melt and in the resulting powder.

Certain combinations of gases and liquids result in the gas being highly soluble in the liquid. For example, hydrogen is moderately soluble in molten aluminum, in that about 0.7 cubic centimeters of hydrogen at one atmosphere (one atmosphere equals about 15 psi) can dissolve into 100 grams of liquid aluminum, before the aluminum is saturated with the hydrogen and cannot hold any more. For solid aluminum, the solubility is much lower, such as no more than about 0.04 cc hydrogen (at one atmosphere) per 100 grams of solid aluminum. Hydrogen is very soluble in magnesium, in that about 26 cc hydrogen (at one atmosphere) can be dissolved in 100 grams of liquid magnesium before the magnesium is saturated with hydrogen. About 18 cubic centimeters of hydrogen (at one atmosphere) can be held in 100 grams of solid magnesium. The solubility of hydrogen at one atmosphere in liquid copper and iron is 5.5 cc per 100 gm and 27.0 cc per 100 gm, respectively; its solubility in solid copper and iron is 2.0 cc per 100 gm and 7.0 cc per 100 gm, respectively. Gases which liquefy above or below room temperature can be used.

Many other combinations of gas and liquids or solids result in the gas being substantially insoluble in the liquid or solid material. For example, helium has a solubility of less than one millionth cubic centimeter (at atmospheric pressure) per one hundred grams of liquid aluminum, and has an even lower solubility in solid aluminum. We may define a gas as being at least moderately soluble in a liquid material, if at least 0.01 cc of the gas (at atmospheric pressure of about 15 psi) can dissolve in 100 grams of the liquid material. As indicated in FIG. 3, gas molecules shown at 90 are believed to lie in the spaces between liquid molecules 92. However, it is not known why certain gases will dissolve in certain liquids but not in others. A wide variety of melt materials can be used including refractory material and a wide variety of metals.

In order to saturate a liquid such as molten aluminum with a soluble gas such as hydrogen, the gas is present in a predetermined saturation partial pressure such as 1 psi for hydrogen in aluminum. If the partial pressure of the hydrogen is greater than the saturation pressure, then no harm is done, but the amount of the gas in the liquid will not be increased. To regulate the total pressure in the environment, an inert gas such as argon is placed in the environment 24 (FIG. 1) above the melt. Similarly, in the first drop tower 32 the partial pressure of the soluble gas such as hydrogen is preferably maintained at at least the saturation partial pressure such as about 1 psi for hydrogen in aluminum. Maintaining such a partial pressure avoids the migration of the soluble gas out of the shell while it is liquid. An inert gas such as argon or helium is included in the environment 42 to control the total pressure (e.g., 10 psi) of gas therein. The total pressure of gas at 58 in the second drop tower 54 is preferably lower (e.g., 5 psi) than the pressure (e.g., 8 psi) of the gas in the gas bubble 48 within the initially formed shell, and is also preferably lower than the total pressure in the first drop tower 42, in order to expand the shell by its remelting and drop through the second tower. The size of the shell produced after the remelt and dropping depends upon the pressure in the second drop tower.

During the drop of the remelted shell in the second drop tower, additional soluble gas can be pumped into the shell by maintaining at least the saturation partial pressure of the soluble gas in the second drop tower. Additional gas is pumped into the shell in the second drop tower, because the periphery of the shell is the part that first melts. The periphery of the shell at 36D (FIG. 7) will have a low concentration of the soluble gas, since the periphery was previously solid and material in a solid state generally carries a lower concentration of any particular soluble gas than in the liquid state. Thus, the soluble gas in the environment around the remelting shell can permeate the shell which is being liquefied. If the totally liquefied shell is soon cooled starting from the outside, the soluble gas that permeated the shell cannot escape through the solidifying periphery of the shell, and it is pumped inwardly as the depth of solidification increases until the shell is completely solidified.

Thus, the invention provides a method for producing gas-filled shells of very small diameter. This is accomplished by saturating the molten shell material with a soluble gas to form a gas-liquid solution, atomizing the solution and cooling it, to trap the soluble gas as a bubble inside the solid shell. The aspect ratio of the shell can be increased, by remelting the shell in free fall, in an environment of lower pressure than the gas bubble, to permit the gas bubble to expand the shell.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:

1. A method for forming gas-filled shells comprising:
   establishing a quantity of solidifiable melt material in a molten state in the presence of a gas that is at least moderately soluble in the melt material, to form a quantity of a solution of the molten melt material and gas wherein the proportion of said gas is greater than the proportion of said gas which can remain dissolved in the solid state of said melt material;
   atomizing said quantity of solution of molten melt material and gas, into a multiplicity of separate droplets;
   cooling said separate droplets from the outside, until the melt material therein solidifies, whereby to form hollow shells with a bubble of said gas in the hollow of each shell.

2. The method described in claim 1 wherein:
   said step of atomizing includes dividing said melt material into droplets that each initially includes said gas in solution in said melt material, and said step of cooling includes avoiding further heating of said droplets and immediately beginning to cool said droplets after they are formed.

3. The method described in claim 1 including:
   reheating said hollow shells which have a gas bubble therein, while they are separate from each other, in an environment of lower total pressure than the pressure of gas in said bubble.

4. The method described in claim 3 wherein:
   said melt material melts at a temperature above 1000° C., and said step of cooling includes maintaining said shells at a temperature above 500° C. until said step of reheating.

5. The method described in claim 1 wherein:
   said gas has a solubility in said melt material of more than 0.01 cc gas at atmospheric pressure per 100 grams of said melt material when the melt material is liquid.

6. The method described in claim 1 including:
   reheating said droplets after they have been cooled to form shells while said shells are separated from each other, in an atmosphere that includes said soluble gas at at least about the saturation partial pressure of said soluble gas in the liquid form of said melt material.

7. The method described in claim 1 wherein:
   said step of establishing the melt material in said gas, includes establishing said gas at a partial pressure at least equal to the saturation partial pressure of said gas in the liquid form of said melt material.

8. A method for processing a hollow shell comprising:
   establishing a hollow shell of a shell material which solidifies at room temperature, in a molten state in free fall through a gaseous environment containing a gas which has a solubility of more than 0.01 cc gas at atmospheric pressure per 100 grams of said shell material in its liquid form;
   withdrawing heat from the outside of said shell and solidifying said shell from the outside inwardly, whereby to pump some of said gas into said shell.

9. The method described in claim 8 wherein:
   said step of establishing includes maintaining the partial pressure of said gas, at at least about the saturation pressure of said gas in the liquid form of said shell material.

10. The method described in claim 8 including:
    establishing a quantity of said shell material in a liquid state in a vessel that also contains said gas; and
    dividing said quantity of shell material, while it is in a liquid state, into a multiplicity of droplets and establishing said droplets in free fall, and withdrawing heat from the outside of said droplets and solidifying said droplets, to form a gas bubble inside each droplet to form a gas-filled shells; and wherein
    said step of establishing a hollow shell comprising reheating said gas-filled shells and establishing the in free fall.

11. Apparatus for forming small gas-filled shells comprising:
    means for saturating a molten melt material with a gas which has a solubility in the melt material of at least 0.01 cc of the gas at 15 psi in 100 grams of the melt material, to form a solution of molten melt material and gas;
    means for atomizing said solution to form a plurality of droplets, and for cooling said droplets while they are in free fall until the melt material is solid.

12. The apparatus described in claim 11 including:

means for maintaining the saturation partial pressure of said gas in the environment which surrounds said droplets while the melt material thereof is molten.

13. The apparatus described in claim 11 wherein:

said droplets which have cooled each includes a gas bubble of said gas; and including means for establishing said cooled droplets in free fall and for reheating them until the melt material therein is molten, at a time after said droplets have been cooled in free fall; and means for cooling said reheated droplets while maintaining an environment around said droplets which were reheated, with said environment having a total gas pressure less than the pressure of said gas bubbles.

14. Apparatus for processing gas-filled shells comprising:

means for establishing a hollow shell in free fall in an environment containing a gas which is at least moderately soluable in the shell material;

means for applying heat to the outside of said shell while it is in free fall in said environment, in an amount that melts the shell through its entire thickness; and means for withdrawing heat from the outside of the shell in an amount to solidify the shell.

* * * * *